United States Patent [19]

Dixon et al.

[11] 4,090,395

[45] May 23, 1978

[54] CASING SEAL AND BLOWOUT PREVENTER TESTER AND TEST METHOD

[75] Inventors: William P. Dixon, North Palm Beach, Fla.; Thomas C. Caldwell, Stavanger, Norway; William T. Ilfrey, Houston, Tex.

[73] Assignee: Exxon Production Research Company, Houston, Tex.

[21] Appl. No.: 782,108

[22] Filed: Mar. 28, 1977

[51] Int. Cl.² ............................................. G01M 3/28
[52] U.S. Cl. ................................. 73/40.5 R; 73/46; 166/250
[58] Field of Search ............... 73/40.5 R, 46, 49.8; 166/250, 183, 188

[56] References Cited

U.S. PATENT DOCUMENTS

| 2,067,499 | 1/1937 | Millmine | 73/40.5 R X |
|---|---|---|---|
| 2,540,322 | 2/1951 | Christensen | 73/40.5 R X |
| 2,951,363 | 9/1960 | Diodene | 73/40.5 R |
| 3,177,703 | 4/1965 | Waters et al. | 73/40.5 R |
| 3,827,285 | 8/1974 | Grove | 73/46 |
| 3,872,713 | 3/1975 | Ilfrey | 73/40.5 R |
| 3,897,824 | 8/1975 | Fisher | 73/40.5 R X |
| 4,018,276 | 4/1977 | Bode | 73/40.5 R X |

*Primary Examiner*—Richard C. Queisser
*Assistant Examiner*—Joseph W. Roskos
*Attorney, Agent, or Firm*—Salvatore J. Casamassima

[57] ABSTRACT

Method and apparatus are disclosed for testing the pressure integrity of blowout preventers and wellhead casing hanger seals. An annular pressure chamber between the blowout preventer and wellhead casing hanger is formed by closing the blowout preventer on a tubular member having a test plug which seats within and sealingly engages the casing hanger. Pressure sensing means disposed along the length of the tubular member are used to monitor pressure above, below and within the annular chamber. Pressure changes detected by the sensing means are indicative of leakage across the blowout preventer or wellhead casing seal.

16 Claims, 1 Drawing Figure

U.S.Patent May 23, 1978 4,090,395
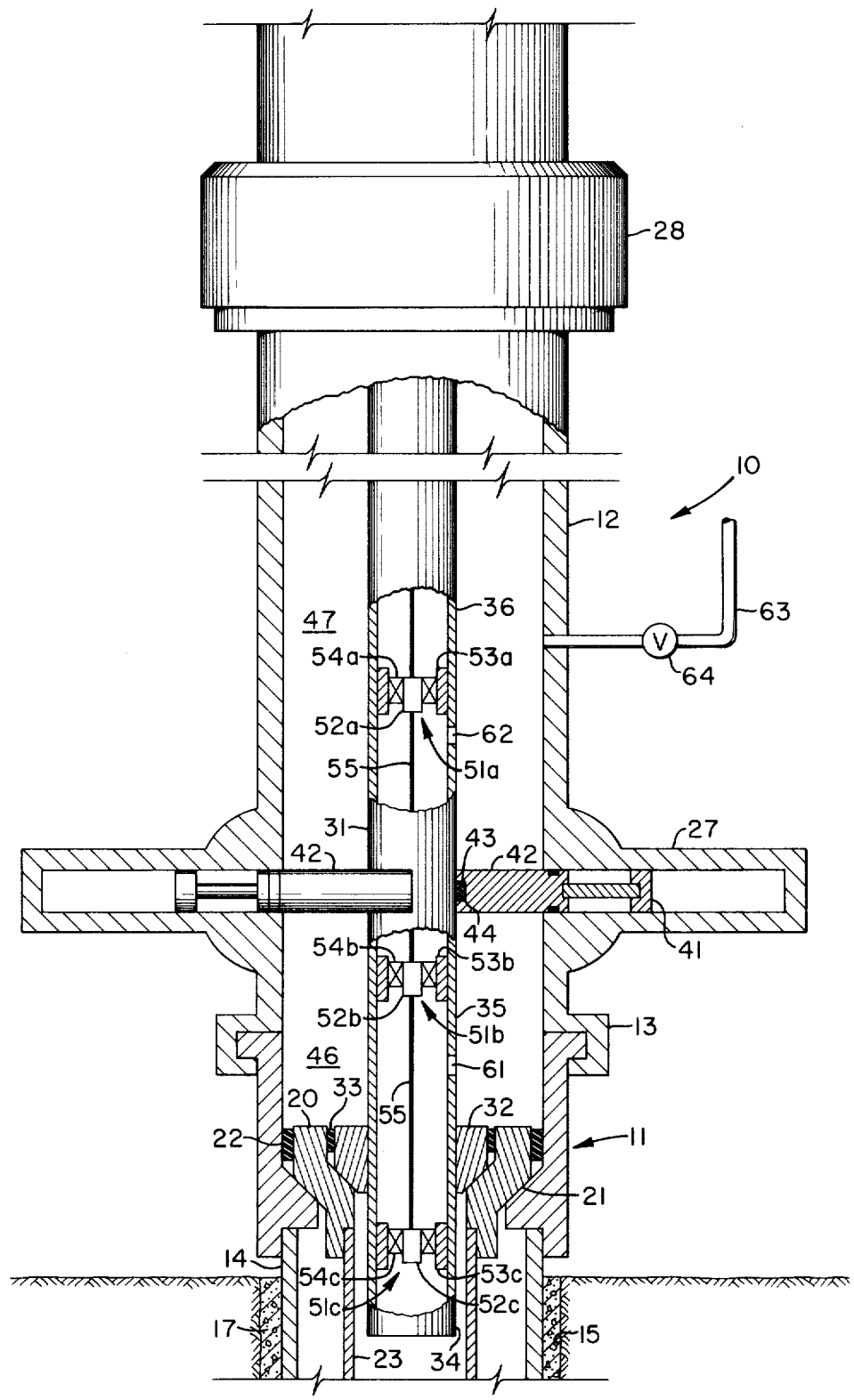

CASING SEAL AND BLOWOUT PREVENTER TESTER AND TEST METHOD

BACKGROUND OF THE INVENTION

1. Field of the Invention

The present invention relates to method and apparatus for testing blowout preventers and wellhead casing seals.

2. Description of the Prior Art

In completing offshore oil and gas wells it is necessary to install a wellhead and blowout preventer stack. The wellhead is installed by mounting it on the upper end of large diameter surface casing which has been lowered into a borehole and cemented in place. Because the casing string used to complete the remainder of the well will be of a smaller diameter than the surface casing used to install the wellhead, the wellhead is usually adapted to sealably support an inner concentric string of casing. A casing hanger, to which is affixed an inner string of casing, is lowered and landed within the bowl of the wellhead. The hanger, which has an enlarged diameter and is adapted to be supported by the wellhead bowl, is provided with a seal assembly around its outer periphery. The casing hanger is also adapted to land the next string of casing. Thus a nest of casing hangers can be employed to suspend successively smaller concentric strings of casing.

Secured on top of the wellhead is the blowout preventer stack. The BOP stack is usually an assemblage of one or more blowout preventers mounted together in a vertical arrangement. A combination of various types of preventers such as annular preventers, pipe rams, and shear rams is employed to provide adequate well safety, kick control, and blowout prevention under a wide range of working pressures and conditions.

To ensure that the wellhead casing hanger seals and blowout preventers provide the pressure integrity for which they were designed it is necessary to pressure test seal and blowout preventer. Almost all test procedures currently employed involve use of a drill string tool provided with an annular seal assembly. The seal assembly is lowered on a drill string until it engages and seats with the casing hanger bowl thereby closing off the upper end of the drill string. The blowout preventer to be tested is then closed around the drill string creating an annular chamber defined by the drill string, seal assembly, blowout preventer and wellhead. The annular chamber is then pressurized by introducing a fluid into the chamber through a kill or choke line. Detection of pressure leak off from around the wellhead casing seal or blowout preventer is then interpreted as indicating a faulty casing seal or preventer.

The main disadvantage of the above procedure is that leakage of a liquid across the casing seal or preventer is often at a slow, undetectable rate. Another technique, as exemplified and described in U.S. Pat. No. 3,093,996 (Jones), seeks to avoid this problem by employing a gas under moderate pressure as the testing fluid, the theory being that a leak which will readily permit the passage of gas will not necessarily leak liquid test fluid. However, such test procedures do not subject the seals in question to the high pressures which they must ultimately withstand. A seal which does not leak gas at 100 or 200 psi does not always indicate that the seal will function properly at 5000 psi.

A partial solution to the problem aof ascertaining leak detection is disclosed in U.S. Pat. No. 3,872,713 (Ilfrey et al). In that patent, an apparatus for testing wellhead casing seals employs a pressure sensing device positioned within a portion of a tubular test tool situated below the casing seal. Leakage of fluid past the casing seal increases the external pressure of the fluid surrounding the lower portion of tool causing the pressure sensing device to give a positive reading. Signals from the pressure sensing device are transmitted to the surface via a wireline cable. The above apparatus, however, only detects casing seal leaks and cannot indicate the pressure integrity of the blowout preventers.

The prior art therefore fails to provide a method or apparatus for rapidly and accurately detecting leakage of both a wellhead casing hanger seal and a blowout preventer.

SUMMARY OF THE INVENTION

The method and apparatus of the present invention provide a positive test for determining the pressure integrity of both blowout preventers and wellhead casing hanger seals. The apparatus of the present invention includes a tubular member, preferably a drill pipe, which downwardly extends into and through the wellhead. With the blowout preventer in a closed position, the tubular member defines an annular chamber between the preventer and wellhead casing hanger. Means for sealing off the casing hanger opening are adapted to the tubular member, the sealing means preferably being a cylindrical member having an outer seal which snugly fits within the casing hanger. Means for pressurizing the annular chamber between the blowout preventer and casing hanger are also provided. Disposed along the length of the tubular member are pressure sensing means, preferably pressure transducers, which detect and monitor pressures above, below, and within the annular chamber. Changes in pressures monitored by the sensing means can be readily interpreted to indicate whether there is a leakage problem caused by a defective or malfunctioning blowout preventer or casing hanger seal.

In accordance with the method of the present invention, the casing hanger is first sealed off, preferably by lowering into the wellhead the tubular member and attached sealing means described above. The annular chamber between the blowout preventer to be tested and the casing hanger is then pressurized, preferably by introducing fluid under high pressure through a kill or choke line. In the sequence of operation, the pressurized annular chamber can be formed either by pressurizing the entire BOP stack and closing the preventer or by closing the preventer and pressurizing the chamber.

It is preferred to have the uppermost annular preventer in a closed position so that the BOP stack is divided into an upper chamber located between the annular preventer and blowout preventer to be tested and a lower, pressurized chamber between the blowout preventer and the casing hanger. Once the lower chamber has been pressurized, the pressures above, below and within the lower chamber are then monitored for a sufficient length of time to determine whether the blowout preventer or casing hanger is leaking. Preferably, pressure sensors would be used to monitor pressures within the upper and lower pressure chambers and below the casing hanger.

BRIEF DESCRIPTION OF THE DRAWING

The drawing is a partial cross-sectional elevation view of a subsea wellhead and blowout preventer in combination with the apparatus of the invention.

DESCRIPTION OF THE PREFERRED EMBODIMENT

The drawing is a cross-sectional schematic view of a subsea assembly 10 which is typical of those used in commercial floating drilling operations. Comprising the assembly is wellhead 11 and blowout preventer stack 12 which are attached to each other by connector 13. Also attached to wellhead 11 is outer casing string 14 which downwardly extends into borehole 15. Filling the annular space between the outer casing string and borehole and securing the casing in place is cement 17.

A casing hanger 20 is located within the inner bowl of wellhead 11. The casing hanger is sized to fit within the inner bowl and is beveled around its outer periphery so as to mate with and be supported by the inwardly extending shoulder 21 of wellhead 11. Providing a tight annular seal between the casing hanger and wellhead is casing hanger seal 22 which is disposed about the outer periphery of casing hanger 20. Connected at its upper end to casing hanger 20 is inner casing string 23 which is concentrically positioned within outer casing string 14.

Positioned above wellhead 11 is blowout preventer stack 12, portions of which are shown. The BOP stack normally includes several annular preventers and several ram-type preventers such as pipe and shear rams. The portions of the BOP stack shown in the drawing include a cross-sectional view of pipe ram blowout preventer 27 and an exterior view of annular blowout preventer 28. Annular preventer 28 is shown above the cutaway section and represents the uppermost preventer on the BOP stack.

The test tool of the present invention comprises a tubular member 31 which extends through the BOP stack and wellhead. The tubular member can be the end of a drill string which has been lowered from the surface. Attached to the lower end of tubular member 31 is test plug 32 which is a substantially cylindrical member sized to fit within the casing hanger 20. The outer periphery of test plug 32 is beveled to provide uniform engagement with the inner shoulder of casing hanger 20. A circumferential seal 33 extending around the outer periphery of the test plug isolates a lower portion 34 of tubular member 31 positioned below the test plug.

Pipe ram blowout preventer 27 is shown in a closed position in the drawing. Preventer 27 is closed by actuation of piston assemblies 41 which push ram assemblies 42 into contact with tubular member 31. Providing a tight seal around member 31 are ram seals 43 which are fitted within recess 44 of ram assembly 42. With preventer 27 in a closed position, a middle portion 35 of tubular member 31 is isolated and enclosed within annular chamber 46 located between preventer assembly 42 and casing hanger 20. It should be noted that an upper portion 36 of the tubular member can also be isolated and enclosed within upper chamber 47 with annular preventer 28 and ram preventer 27 in closed positions.

A plurality of pressure sensing means are disposed along the length of tubular member 31 and are provided to detect and monitor pressure at various points along the member. The means depicted includes a pressure detector assembly, three of which are shown in the drawing and designated by numerals 51a, 51b and 51c. The components comprising and corresponding to the detector assemblies are pressure tranducers 52a, 52b and 52c; landing nipples 53a, 53b and 53c and pack-off devices 54a, 54b and 54c. Each pressure transducer and pack-off device form an integral unit which is run on wireline cable 55 and landed in the corresponding nipple on member 31 to which it is keyed. Cable 55 is of a type commonly used in well logging operations and is capable of trasmitting electrical signals to and from the detector assemblies. Although detector assemblies 51a, 51b and 51c are shown as independent devices, they can be made integral with tubular member 31. For example, the pressure transducers can be mounted fixedly within the member and thus be run in and out on the drill string.

Pressure transducers 52a, 52b and 52c are situated to monitor pressures within the bore of tubular member 31. Transducer 52c being exposed to the open end of lower portion 34 of member 31, will detect the pressure within inner casing string 23. Port 61, located along middle portion 35 of member 31, exposes pressure transducer 52b to the pressure within the annular chamber 46. Seals provided by pack-off devices 54b and 54c isolate that portion of the inner bore of member 31 in communication with port 61 thereby insuring that transducer 52b only detects the pressure within annular chamber 46. Similarly port 62, located along upper portion 36 of member 31, exposes transducer 52a to the pressure within upper chamber 47 located between ram preventer 27 and annular preventer 28.

The apparatus of the present invention can be used to test the pressure integrity of both a blowout preventer and wellhead casing seal. In fact, both a blowout preventer and wellhead casing hanger seal can be simultaneously tested using the apparatus and method of the present invention. For example, to test preventer 27 and wellhead casing hanger seal 22, as depicted in the drawing, BOP stack 12 is first pressurized to a predetermined test level. This is accomplished by closing annular preventer 28 and pressurizing the chamber between annular preventer 28 and casing hanger 20. The chamber is pressurized by introducing a fluid, such as drilling fluid or sea water, through choke line 63 until the chamber is filled and pressurized to the predetermined level. After closing valve 64, ram preventer 27 is then closed to the position shown in the drawing, effectively dividing the pressure chamber into upper chamber 47, located between the two preventers, and lower annular chamber 46, located between preventer 27 and casing hanger 20. Any pressure increase that occurs as a result of closing the ram preventer is bled off through valve 64 before the ram preventer 27 is completely closed to maintain the pressure at the desired test level. After preventer 27 is closed additional pressure is bled off from upper chamber 47 so that the pressure within annular chamber 46 exceeds the pressure within chamber 47. The test fluid is thus confined under high pressure within chamber 46.

After the above steps are completed pressure transducers 52a, 52b and 52c should be monitored for approximately 10 minutes. However, the exact time required to accomplish a particular test is governed by the general equation:

$$T = (7.481\ En\ Vt\ \Delta P)/F$$

where

T = time required for the test
En = compressibility of test fluid (psi$^{-1}$)
Vt = total volume of fluid tested (ft$^3$)
ΔP = significant pressure drop detectable by pressure transducer (psi)
F = minimum flow rate indicative of a leak (gpm)
For example, assume $En = 3.0 \times 10^{-6}$ psi$^{-1}$, $Vt$ (volume in annular chamber 46) = 44.79 ft$^3$, $\Delta P = 50$ psi and $F = 6.75 \times 10^{-3}$ gpm. Substituting these numbers in the above equation, the necessary test time for a reliable pressure test would be 7.447 minutes. Thus approximately 7½ minutes would be needed to adequately determine whether there was a leak across preventer 27 or casing hanger seal 22.

Interpretation of the results of the pressure monitoring will be as follows:

1. If transducer 52b shows a decrease in pressure and transducer 52a an increase, ram preventer 27 is leaking. Pressurized fluids leaking from chamber 46 across ram seals 43 or other seal components of the preventer causes a decrease in fluid pressure in chamber 46 and an increase in pressure in upper chamber 47.

2. Pressurized fluids leaking across casing hanger seal 22 causes a decrease in fluid pressure in chamber 46. However, none of the leaking fluid would enter the bore of inner casing 23. Therefore, if transducer 52b shows a decrease in pressure and transducers 52a and 52c remain constant, wellhead casing hanger seal 22 is leaking. Note, however, that if transducer 52c records an increase in pressure, fluids are leaking across circumferential seal 33 of test plug 32. This indicates a faulty test plug seal or improper seating of the test plug, necessitating a repeat of the test with a properly sealed and seated test plug.

The above discussion regarding the testing of ram preventer 27 is intended to be exemplary in nature. With the exception of a shear ram, the same general procedure can be followed to test other types of preventers on the BOP stack. By strategically placing detector assemblies 51a, 51b and 51c (and additional assemblies, if necessary) along the length of tubular member 31, all annular and pipe rams can be tested sequentially without removing or repositioning the tubular member. Additional choke lines (not shown) would be positioned along the length of BOP stack 12 in order to provide the necessary pressurization of the annular chamber around tubular member 31. It should be appreciated that if a choke line is located below the preventer to be tested, the sequence of operation can be somewhat altered. For example, if the choke line is positioned below the preventer the annular chamber between the preventer and the casing hanger can be pressurized by first closing the preventer and then introducing fluid under pressure through the choke line. In the embodiment shown in the drawing, preventer 42 is closed after pressurization since there is no choke line below the preventer capable of pressurizing chamber 46. It should, therefore, be emphasized that the exact sequence of steps is not critical so long as the annular chamber between the casing hanger and the preventer to be tested is pressurized.

The test procedure for upper annular preventer 28 is somewhat different than the general test procedure followed for the other preventers. To test annular preventer 28, the preventer is closed, all other preventers being in an open position. The annular chamber between annular preventer 28 and casing hanger 20 is then pressurized by introducing fluid under pressure through choke line 63 or any other choke line situated below the preventer. Valve 64 is then closed and pressure transducers 51a, 51b and 51c monitored for the requisite period of time. Note that both transducers 51a and 51b, being situated below preventer 28, will be exposed to the same pressure within the chamber. Thus either or both of the transducers can be monitored to detect pressure changes. However, it is preferrable to monitor both transducers in the event one malfunctions. Assuming casing hanger seal 22 and circumferential seal 33 have previously tested satisfactorily, a decrease in the pressure detected by transducers 51a or 51b indicates that upper annular preventer 28 is leaking.

It should be apparent from the foregoing that the apparatus and method of the present invention offer significant advantages over blowout preventer test tools or wellhead casing seal test tools previously known to the art. While the present invention has been primarily described with regard to the foregoing embodiments, it should be understood that several variations and modifications may be made in the embodiments described herein without departing from the broad inventive concept disclosed herein.

What is claimed is:

1. Apparatus for testing the pressure integrity of a blowout preventer and casing hanger seal of a wellhead comprising:
   a tubular member which extends through said wellhead so as to provide an annular chamber between said blowout preventer and casing hanger when said blowout preventer is in a closed position;
   means adapted to said tubular member for sealing off said casing hanger;
   means for pressurizing said annular chamber; and
   a plurality of pressure sensing means disposed along the length of said tubular member to simultaneously monitor the pressures above, below and within said annular chamber so that leakage across said blowout preventer and casing hanger can be readily detected.

2. The apparatus of claim 1 wherein said sealing means is a cylindrical member attached to said tubular member, said cylindrical member being provided with a circumferential seal about its outer periphery and sized to seat within said casing hanger.

3. The apparatus of claim 1 wherein said tubular member is a drill pipe.

4. The apparatus of claim 1 wherein said pressurizing means is a choke line capable of introducing pressurized fluid into said annular chamber.

5. The apparatus of claim 1 wherein said pressure sensing means are pressure sensing transducers.

6. The apparatus of claim 5 wherein said pressure sensing transducers are positioned within said tubular member such that at least one transducer is exposed to the pressure within said annular chamber, at least one transducer is exposed to the pressure below said sealing means, and at least one transducer is exposed to the pressure above said blowout preventer.

7. A method of testing the pressure integrity of a blowout preventer and casing hanger seal of a wellhead comprising:
   sealing off said casing hanger;
   pressurizing the annular chamber formed between said blowout preventer and said casing hanger by closing an upper annular preventer, introducing a fluid under high pressure into the chamber between said casing hanger and said upper annular preventer, and closing said blowout preventer; and monitoring the pressures above, below and within said annular chamber.

8. The method of claim 7 wherein the casing hanger is sealed off by inserting a cylindrical member into said casing hanger which seals off said casing hanger.

9. The method of claim 8 wherein said cylindrical member is attached to a tubular member which is lowered into said wellhead.

10. The method of claim 7 wherein said fluid under high pressure is introduced through a choke line.

11. A method of testing within a blowout preventer stack and wellhead the pressure integrity of a blowout preventer and casing hanger seal comprising:
lowering a tubular member into said wellhead, said tubular member having adapted thereon a cylindrical member which seals off said casing hanger;
closing an upper annular preventer of said blowout preventer stack;
pressurizing said blowout preventer stack;
closing said blowout preventer to form an annular pressurized chamber between said casing hanger and said blowout preventer; and
monitoring the pressures above, below, and within said annular chamber.

12. The method of claim 11 wherein the pressure above, below, and within said annular chamber is detected and monitored by means of pressure sensing devices disposed along the length of said tubular member.

13. A method of testing within a blowout preventer stack and wellhead the pressure integrity of a blowout preventer and casing hanger seal comprising:
lowering a tubular member into said wellhead, said tubular member having adapted thereon a cylindrical member which seals off said casing hanger;
pressurizing said blowout preventer stack by closing an upper annular preventer of said stack and introducing a fluid under high pressure into the chamber between said casing hanger and said annular preventer;
closing said blowout preventer so as to divide said pressure chamber into an upper chamber between said blowout preventer and said annular preventer and a lower chamber between said casing hanger and said blowout preventer; and
simultaneously monitoring the pressure below and within said lower chamber and within said upper chamber so that leakage across said blowout preventer and casing hanger may be readily detected.

14. The method of claim 13 wherein some of the pressure within the upper chamber is bled off after said blowout preventer is closed so that the pressure within the upper chamber is less than the pressure within the lower chamber.

15. The method of claim 13 wherein said fluid under high pressure is introduced through a choke line.

16. The method of claim 13 wherein the pressures are monitored by means of pressure sensing devices disposed along the length of said tubular member.

* * * * *